July 7, 1931.   H. H. ELLSWORTH   1,813,391
ANTISKID DEVICE
Filed March 29, 1930    2 Sheets-Sheet 2

Inventor
Henry Hudson Ellsworth
by James R. Hodde
Attorney

Patented July 7, 1931

1,813,391

UNITED STATES PATENT OFFICE

HENRY H. ELLSWORTH, OF COHASSET, MASSACHUSETTS

ANTISKID DEVICE

Application filed March 29, 1930. Serial No. 439,948.

My present invention relates to anti-skid devices, and more particularly to an improved anti-skid device for use in connection with motor vehicles.

The pneumatic tires in use at the present day will not prevent skidding of the vehicle to which they are attached, even though the tread of such tires is of the so called "non-skid" tread. Further, the use of chains will not prevent skidding of a vehicle, the cross-chains seemingly acting as runners on which the vehicle slides.

In my present invention, I have devised an improved non-skid device capable of attachment to the wheel of a vehicle and which device is preferably operated from the driver's seat, and which device will positively prevent not only side slipping or skidding, but also the skidding ahead of the vehicle. In carrying out my invention, I preferably attach to the rim of the wheels of a vehicle, either back or front, or both back and front, a circular member having mounted thereon radially extending sliding members, normally in retracted position, but which may be slid radially so as to extend beyond the periphery of the tire and thus engage with the ground or other surface. In this outward position therefore, these members are rotatable with the wheel and as the usual brake is applied the ends of said members dig into the ground and thus positively prevent skidding in any direction.

The object of my invention therefore, is an improved anti-skid device.

In the accompanying drawings,

Fig. 3 is a section on the line 3—3 of Fig. 2.

Figure 1:
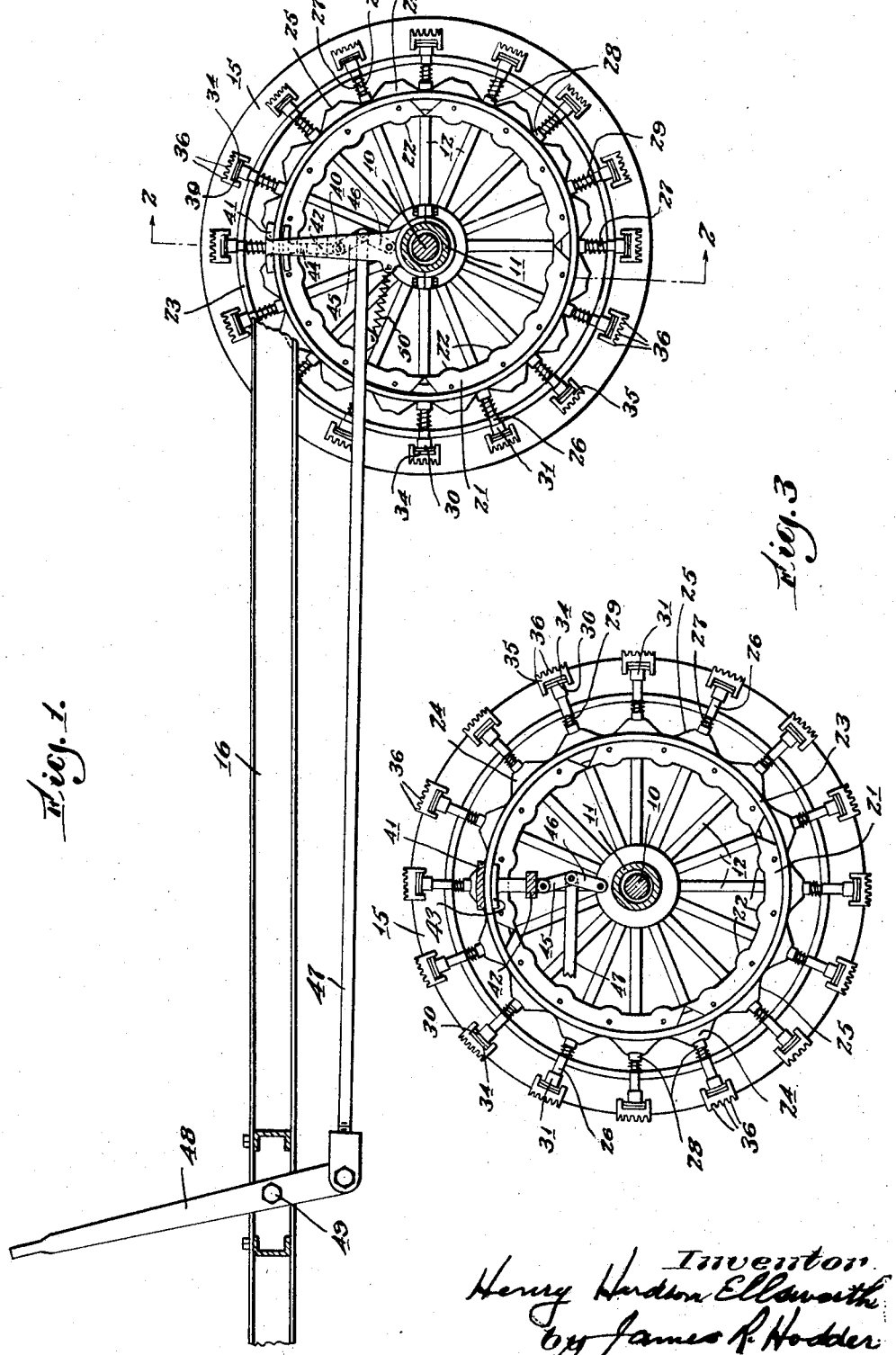
Fig. 1 is a side elevation of my improved device attached to a wheel.

Referring to the drawings, 10 designates an axle of a vehicle, situated within the casing 11, and such axle has attached thereto or rotatable thereon, a wheel 12, having a felly 13 and rim 14. On the rim 14 is mounted the usual pneumatic tire 15. Mounted on the casing 11, or associated therewith in any convenient or usual manner, is a frame member 16. On the inner face of the rim 14 is secured, preferably by welding, a member 17, this member being formed with a flange portion 18, and with a cylindrical portion 19 that is concentric with the casing 11. At the inner end of the cylindrical portion 19 is formed a flange 20, and secured to this flange is an annular plate 21. Formed on the inner circumference of the plate 21 is a plurality of cam members 22, these being of any desired size and spaced equally about the circumference. Rotatably mounted on the outer circumference of the plate 21 and surrounding the cylindrical portion 19 of the member 17 is a cylindrical member or drum 23, this drum having formed on its outer periphery and equally spaced thereabout, a plurality of cam members 24, the central portion of each cam being concave, as indicated at 25. The number of cam members 24 is equal to the number of cam members 22.

On the inner face of the flange 18 are arranged equally spaced radially extending bearing members 26, these bearing members being preferably secured in position by welding. The number of bearing members 26 is equal to the number of cam members 24. In each of the bearing members 26 is slidably mounted a shaft 27 provided at the inner end with an enlarged head 28 that is rounded on its bottom and engages with the cam members 24. A spring 29 located between the inner end of the bearing member 26 and head 28 constantly urges the shaft 27 inwardly toward the axle 10 and keeps the head 28 in engagement with the cam member 24.

Fitting over the outer end of the bearing members 26 and shaft 27 is a skid preventing device composed of a plate 30 having formed integral therewith a sleeve 31 that is provided with a slot 32 and through which slot extends a pin 33 attached to the bearing member 26, this arrangement permitting movement of the plate 30 longitudinally of the bearing members 26 and shaft 27 while preventing rotary movement thereof. The plate 30 is perforated to allow free movement of the shaft 27 therethrough and resting on the outer face of the plate 30 is a cushion 34 of rubber or any other suitable resilient material. Resting on the outer face of the cushion 34 is a member 35 provided with a plurality of teeth or projections 36. The cushion 34 and member 35 are perforated and the shaft 27 extends therethrough, while a pin 37 extending through the shaft 27 prevents the skid preventing device from being accidentally removed therefrom. Formed on the member 35 at each end and at each side thereof, are lugs 38. These lugs 38 are therefore, arranged in pairs and embrace the plate 30 to thereby prevent rotative movement of such member 35 with respect to the plate 30.

Figure 2:
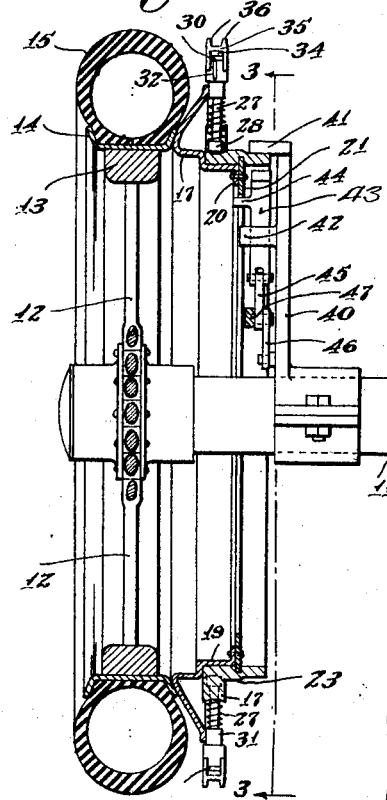
Fig. 2 is a section on the line 2—2 of Fig. 1.
Figure 5:
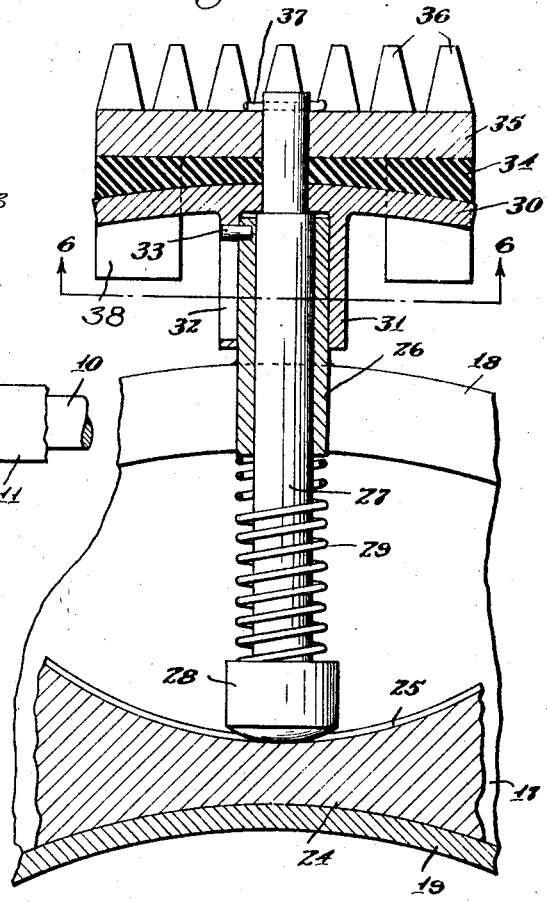
Fig. 5 is a section on the line 5—5 of Fig. 4.
Figure 4:
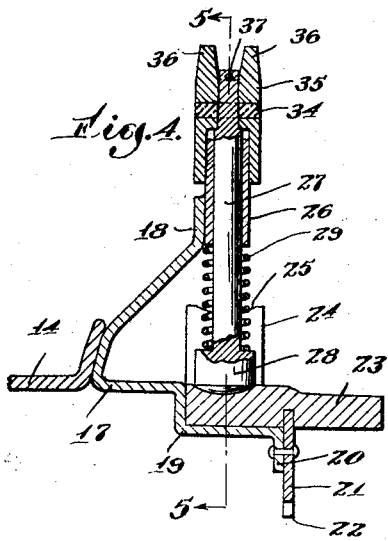
Fig. 4 is a section, on an enlarged scale, of one of the non-skid elements, shown at the upper end of Fig. 2.
Figure 6:
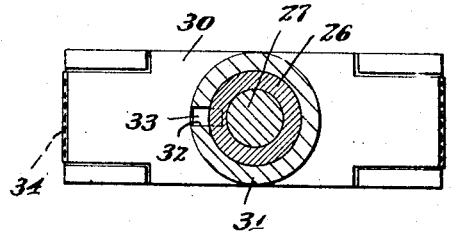
Fig. 6 is a section on the line 6—6 of Fig. 5.

Secured to the casing 11 and extending upwardly therefrom, as viewed in Fig. 2, is a member 40. This member 40 has secured thereto at its outer or free end, a laterally extending member, or brake abutment 41 and is associated with the brake drum 23. Formed on the outer face of the member 40 is a bearing or guideway 42 in which is slidably mounted a brake member 43, the outer end of which is adapted to engage with the inner periphery of the brake drum 23. Formed integral with the member 43 and in position to engage with the cams 22 is a projection 44, for a purpose to be hereinafter described. Pivotally attached to the lower end of the sliding brake member 43 is a link 45. Pivotally attached to the member 40 is a link 46. Pivotally attached to one end of each of the links 45 and 46 is one end of a reach rod 47, this rod extending under the frame member 16 and being pivotally attached at its other end to the lower end of an operating lever 48 pivotally mounted at 49 in the frame member 16. Attached to the rod 47 is one end of a spring 50 the other end of this spring being attached to the member 40, this spring moving the links 45 and 46 back into the position shown in Fig. 1, when the operating lever 48 is released.

The normal position of the device is shown in Fig. 1, and it will be noted from an inspection of such figure that the number of skid preventing devices is relatively great as compared with the diameter of the wheel 12 and tire 15. The device therefore acts as a means for preventing undue wear on the tire 15 should such tire become deflated, as the weight will be supported on the skid preventing devices. The shock and jar will be absorbed by the resilient plates 34.

Assuming the device to have been constructed and arranged as above described and the motor vehicle to be moving along with the parts of the device in the position shown in Fig. 1, and that the vehicle starts to skid. The operator pulls back on the lever 48, and through the rod 47, and links 45 and 46, moves the member 43 upwardly, as viewed in Fig. 2, bringing the upper end thereof into engagement with the brake drum 23. The brake drum 23 is thus brought to rest and the shafts 27, being attached to the still rotating wheel 12, ride up on the cams 24 and into the concave portions 25 thereof. At this time the projection 44 engages with one of the cams 22 and throws the member 43 downwardly so as to allow the drum 23 to rotate with the wheel 12. The operator then releases the lever 48 and the spring 50 returns the links 45 and 46 to their normal position. The combined tension of the springs 29 is sufficient to hold the heads 28 of the bolts 27 in the concave portion 25 of the cam members 24 and therefore, the skid preventing devices 35 are held in their outermost position with the teeth or projections 36 extending beyond the periphery of the tire 15, and so in engagement with the ground or other surface. The teeth or projections 36 dig into the ground or other surface and so prevent both side and other slipping of the wheels 12.

Having thus described my invention, what I claim as new is:

1. In a device of the kind described, the combination of a rotatable member, a plurality of radially extending projections mounted thereon, a brake member rotatably mounted on the rotatable member, a plurality of cams on said brake member, a stationary element, slidably mounted means thereon for engaging with the brake member, whereby the brake member is relatively rotated on the rotatable member, a plurality of cams on the rotatable member, and means on the slidable element for engaging said last named cams to release the brake member while the same is in locked position.

2. In an anti-skid device for automobiles, having as elements a plurality of tractive elements rotatable with the wheel, and adapted to be operated radially therewith to engage the surface of the road; in combination therewith, a ring member rotatable with the wheel, and relatively rotatable thereto, and provided with a plurality of cams in engagement with, and adapted to move the respective anti-skid elements radially to project beyond the line of the periphery of the wheel; and means for retarding the rotation of the ring relative to the rotation of the wheel, from an initial position and within predetermined limits in either direction depending on the direction of rotation of the wheel.

3. In an anti-skid device for automobiles, having as elements a plurality of tractive elements rotatable with the wheel, and adapted to be operated radially therewith to engage the surface of the road, and a member rotatable with the wheel and relatively rotatable thereto, and provided with a plurality of cams in engagement with, and adapted to move the respective anti-skid elements radially to project beyond the line of the periphery of the wheel; in combination therewith a friction element, adapted to be engaged with the cam member for the purpose of retarding the rotation of the ring relative to the rotation of the wheel, from an initial position and within predetermined limits in either direction depending on the direction of rotation of the wheel; and means operative on the friction element, for controlling its engagement with the cam elements.

4. In an anti-skid device for automobiles, having as elements a plurality of tractive elements rotatable with the wheel, and adapted to be operated radially therewith to engage the surface of the road; in combination therewith, a member, rotatable with the wheel, and relatively rotatable thereto, and adapted to actuate the respective anti-skid elements to move radially to project beyond the line of the periphery of the wheel; and means for retarding the rotation of the ring element relative to the rotation of the wheel, from an initial position and within predetermined limits in either direction depending on the direction of rotation of the wheel.

In testimony whereof, I have signed my name to this specification.

HENRY H. ELLSWORTH.